Patented Oct. 28, 1941

2,260,870

UNITED STATES PATENT OFFICE 2,260,870

MEDICINAL PREPARATION

Simon L. Ruskin, New York, N. Y.

No Drawing. Application September 26, 1934,
Serial No. 745,527

1 Claim. (Cl. 260—344)

This invention relates to new chemical compounds, more particularly to metal salts of an organic acid having the following structural formula:

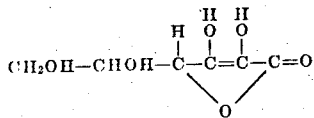

This compound is known as ascorbic acid. It is a white or slightly yellowish crystalline material which is readily soluble in certain organic solvents. It has been determined that this substance is the active member of vitamin C. Extensive series of experiments have determined that when administered to the living organism it has all of the beneficial effects of vitamin C and it is now believed that the compound is the vitamin in pure form.

In the metal compounds of this acid, as formed for example by neutralization or double decomposition, the metal appears to replace the hydrogen of an hydroxyl group, probably the group attached to the alpha-carbon, but these compounds are nevertheless generally referred to as salts.

While this compound may be used in the treatment of diseases caused by deficiency of vitamin C, it is highly desirable that the effectiveness of this compound for said control of diseases be substantially increased. It is also highly desirable that the therapeutic properties of the compound be coupled with other substances having therapeutic properties in order that the resulting compound may have additional curative values not possessed by original acid and thus be effective for control and cure also of other diseases.

It is, therefore, among the objects of the present invention to modify ascorbic acid by combining the same with other compounds whereby its value in the treatment of diseases is materially increased.

It is a further object of this invention to provide a method whereby the new compounds may be readily obtained in a simple manner at a relatively low cost and in pure and active form.

More specifically, it is an object of the invention to produce new metal compounds of ascorbic acid which I have found to possess the vitamin-like properties of such acid while at the same time incorporating the metal in a form readily assimilable by the animal organism. Thus 1 have found that calcium ascorbate increases the calcium content of the blood much better than any other calcium compounds known to me, being more readily absorbed and maintaining the calcium content at a higher level than similar quantities of other calcium salts. I have found that in the treatment of rickets calcium ascorbate is more effective than other calcium salts and produces evidence of more rapid clinical improvement. In the treatment of pyorrhea alveolaris, calcium ascorbate diminishes the tendency toward bleeding of the gums, stops the recession of the alveolus from the crown of the tooth, and causes rapid improvement of the condition. This calcium salt, moreover, effects more ready deposition of calcium in tooth formation. It is also an active agent in strengthening the structure of the blood vessels and in promoting clotting of the blood, thereby reducing hemorrhages.

In carrying out the objects of my invention I first dissolve ascorbic acid in a suitable solvent, preferably water. To the solution thus formed I may add a solution of a salt of the metal which it is desired to combine with the acid. In most cases the reaction between the acid and the salt takes place spontaneously without the application of heat or pressure. It is sometimes desirable to moderately heat the reaction mixture in order to speed the reaction and render it more complete. In some cases, the reaction may be caused to take place under pressure and heat may be used simultaneously therewith.

In other cases the procedure may include the preparation of a solution of ascorbic acid in water to which is added a sufficient amount of a caustic alkali solution, such as sodium hydroxide, to cause the formation of the corresponding ascorbate. To this solution there may then be added a solution of salt of the metal which is to be combined with the acid radical. The solution may in certain cases be heated to boiling in order to cause the reaction to take place, although in many instances the reaction will go quickly to completion in the cold. If the resulting metal compound is soluble in the solution then other steps are taken to cause precipitation thereof.

The ascorbate compound may be purified by dissolving the impure compound and recrystallizing the same, one or a number of times.

To illustrate more in detail the nature of my invention, the following examples are presented but it is to be understood that the invention is not limited thereto:

*Example 1.*—A solution is made, utilizing 175 parts by weight of ascorbic acid and 400 cc. of water. The water is heated to facilitate solution of the acid. To the solution is added a concentrated solution of sodium hydroxide with constant stirring until 40 parts by weight of sodium hydroxide has been introduced. This results in the formation of sodium ascorbate, which has most probably the structural formula

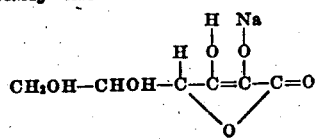

To the solution is then added 53 parts by weight of ferric chloride, either in the solid state or in solution. It is added gradually and with stirring. The color of the solution gradually changes to a dark yellow, but remains clear. The solution is heated to boiling and concentrated sodium hydroxide solution is added in excess until there separates from the solution a precipitate which is dark brown or black. The precipitate is filtered off and is dissolved in water. It is recrystallized by the addition of sodium hydroxide to the solution which causes precipitation of the compound. It may be again filtered and dissolved in water containing a small amount of sodium citrate which acts as a solubilizing agent. This clarifies the solution of the iron salt of ascorbic acid.

Example 2.—A solution is made as before of 175 parts by weight of ascorbic acid in water and to this is added slowly and with stirring to 155 parts of calcium gluconate. The solution which is at first clear, gradually becomes cloudy and a precipitate forms. The precipitate is filtered and is suspended in water to which is added a small amount of sucrose. The mixture is heated to a moderate degree causing the precipitate to disappear. This provides a solution of the calcium salt of ascorbic acid.

Example 3.—There is first formed the sodium salt of ascorbic acid as set forth in Example 1. To the solution there is added 67 parts by weight of cupric chloride, either in the solid state or as a concentrated solution in water. As the reaction proceeds there is noted a change of color of the solution to a light blue, the solution remaining clear. The solution is then warmed gently and an excess of sodium hydroxide is added, causing precipitation of the copper salt of hexuronic acid. This may be filtered and redissolved in water containing a small amount of a solubilizing agent such as sodium citrate.

Although I have described my invention setting forth several specific embodiments thereof, my invention is not limited by the examples but is merely illustrated thereby. From the examples it will be seen that many compounds of metals with the hexuronic acid may be made. For example, I have produced a manganese, bismuth, arsenic, silver, gold, mercury, zinc, aluminum and tin salts of hexuronic acid. All of the compounds have therapeutic value by reason of the character of the metal and the character of the acid which is combined therewith. The iron salt, as well as the copper salt, has been found to be particularly effective in various types of anemia and in scurvy. These compounds are far superior to the previously known iron or copper compounds used for this purpose.

The calcium salt is effective in that it is adapted to cause the deposition of calcium in the formation of teeth and it tends to prevent the development of pyorrhoea. It is also of value as already indicated, in causing clotting and thereby preventing hemorrhages.

The manganese salt is adapted to stimulate the formation of bone marrow and is therefore of particular value in inadequate function of bone marrow. The bismuth and arsenic salts have been found of considerable value in the treatment of syphilis and allied diseases. The silver and mercury salts are valuable as antiseptics whereas the zinc and aluminum may be used as dusting powders and mouth washes. The sodium salt is of value in that it is readily absorbed by the body. The tin compound is suitable for the treatment of infections, particularly infections of staphylococci.

In general, these compounds as well as compounds of the ascorbic acid with other metals are of value in the formation of true bone in proper metabolism of mineral salts and in the proper clotting of blood. They are also of general value in diseases and conditions caused by a lack of vitamin C.

It will, of course, be apparent to those skilled in the art that the above description of process may be varied to considerable extent within the scope of my invention. For example, the various compounds may be formed by other processes than disclosed above. The resulting compounds may be used without purification or various purifications of the same may be conducted. In order to render some of the compounds more soluble, as for example, the iron compound, I may use buffers, such as sodium citrate, or other suitable substances. The amount of the buffer may be varied at will and within wide limits. Usually, the solubility is dependent upon the hydrogen ion concentration and such buffers tent to prevent changes of solubility of the compounds with changes of pH.

While in Example 2 I have mentioned the use of calcium gluconate, it is obvious that other salts of calcium, such as a chloride, nitrate, acetate, and others may be substituted for the same. Similarly, various salts of the several metals named herein may be used in preparing the ascorbic acid compound thereof. In place of sucrose I may substitute dextrose, glucose, and in fact, almost any other carbohydrate, of the sugar type. The amount of such sugar used may vary greatly and still render a metal compound soluble in water. These and other changes may be made in my invention which is to be broadly construed and is to be limited only by the claim appended hereto.

It will be evident from the above that my novel metal salts of hexuronic or ascorbic acid may be prepared by the double decomposition of a compound having the hexuronic or ascorbic acid radicle (which includes the acid and the salts thereof) with a compound of a metal which will enter into reaction therewith to form the hexuronic or ascorbic salt of such metal. As already indicated the hydroxide of a metal may be employed to form the corresponding salt of such metal. It will be obvious to those skilled in the art that other bases such as the carbonate may be employed.

The metal salt of hexuronic or ascorbic acid may be supplied to the profession as such, or the acid mixed with an equimolecular proportion of a metal base, such as the hydroxide or carbonate may be supplied in the dry state to be mixed with water immediately before use so that a fresh solution is available for administration.

What I claim is:

As a new therapeutic agent adapted to be administered internally, a manganese compound of the organic acid corresponding to the following structural formula:

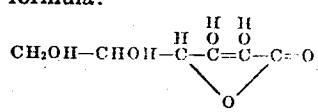

SIMON L. RUSKIN.